(12) United States Patent
Kawashima et al.

(10) Patent No.: US 7,832,764 B2
(45) Date of Patent: Nov. 16, 2010

(54) KNEE PROTECTOR STRUCTURE FOR VEHICLE

(75) Inventors: Tsutomu Kawashima, Tokyo (JP); Shin Moteki, Tokyo (JP); Nobuhiro Nagata, Tokyo (JP); Keigo Hayata, Tokyo (JP); Yoshiharu Nakamura, Tokyo (JP); Yorihito Okuda, Tokyo (JP)

(73) Assignee: Calsonic Kansei Corporation, Tokyo (JP)

( * ) Notice: Subject to any disclaimer, the term of this patent is extended or adjusted under 35 U.S.C. 154(b) by 166 days.

(21) Appl. No.: 11/919,670

(22) PCT Filed: Apr. 21, 2006

(86) PCT No.: PCT/JP2006/308412
§ 371 (c)(1),
(2), (4) Date: Jul. 8, 2008

(87) PCT Pub. No.: WO2006/120868
PCT Pub. Date: Nov. 16, 2006

(65) Prior Publication Data
US 2009/0146405 A1 Jun. 11, 2009

(51) Int. Cl.
*B60R 21/055* (2006.01)
(52) U.S. Cl. ...................................... 280/751
(58) Field of Classification Search ............... 280/751, 280/752; 293/135; 296/39.1, 70, 146.6, 296/187.05; 188/371
See application file for complete search history.

(56) References Cited

U.S. PATENT DOCUMENTS

| | | | |
|---|---|---|---|
| 4,978,136 A * | 12/1990 | Tomita et al. | ............... 280/751 |
| 5,518,270 A | 5/1996 | Hanada et al. | |
| 5,927,755 A * | 7/1999 | Matsuo et al. | ............... 280/752 |
| 6,702,324 B2 * | 3/2004 | Shimoyamada et al. | ..... 280/752 |
| 7,185,917 B2 | 3/2007 | Nagata et al. | |
| 2005/0001416 A1 | 1/2005 | Muramatsu et al. | |

(Continued)

FOREIGN PATENT DOCUMENTS

JP 7-267028 A 10/1995

(Continued)

OTHER PUBLICATIONS

Machine Translation of JP 9-71201.*

*Primary Examiner*—Paul N Dickson
*Assistant Examiner*—Joseph Rocca
(74) *Attorney, Agent, or Firm*—Foley & Lardner LLP (57) ABSTRACT

The present invention relates to a knee protector structure for a vehicle. The present invention intends to make it possible to positively prevent an upper absorption bracket from being deformed with a tensile force exerted through a connecting bracket when a lower absorption bracket is deformed with knee input energy of a small-statured vehicle occupant. The knee protector structure for a vehicle according to the present invention comprises a lower absorption bracket 13 able to absorb knee input energy of a small-statured vehicle occupant, an upper absorption bracket 14 able to absorb knee input energy of a vehicle occupant of an average constitution, a connecting bracket 21 for connection between input-side end portions 18 and 20 of the lower absorption bracket 13 and the upper absorption bracket 14, and tensile force absorbing means 35 disposed near the input-side end portion 20 of the upper absorption bracket 14 and able to absorb a tensile force 34 exerted from the connecting bracket 21.

11 Claims, 8 Drawing Sheets

U.S. PATENT DOCUMENTS

2005/0062276 A1 * 3/2005 Nagata et al. ............... 280/752

FOREIGN PATENT DOCUMENTS

| JP | 9-071201 | | 3/1997 |
| JP | 1044899 | * | 2/1998 |
| JP | 10-217881 A | | 8/1998 |
| JP | 2004-351957 A | | 12/2004 |
| JP | 2005-096525 A | | 4/2005 |

* cited by examiner

KNEE PROTECTOR STRUCTURE FOR VEHICLE

TECHNICAL FIELD

The present invention relates to a knee protector structure for a vehicle.

BACKGROUND ART

In a vehicle such as an automobile, an instrument panel is provided in a front portion within a vehicle compartment (see, for example, Japanese Patent Laid-Open Publication No. 2005-96525).

It has been reviewed to install a knee protector structure in an interior of the instrument panel in order to protect knees of a vehicle occupant in case of emergency.

As such a knee protector structure there has been developed a knee protector structure provided with a lower absorption bracket able to absorb knee input energy of a small-statured vehicle occupant (e.g., a small-statured female occupant) and an upper absorption bracket able to absorb knee input energy of a vehicle occupant of an average constitution (e.g., a male occupant of an average constitution), input-side end portions of the lower absorption bracket and the upper absorption brackets being connected with each other through a connecting bracket.

When a knee of a small-statured vehicle occupant is in contact with the knee protector structure, the lower absorption bracket which lies at a low position is deformed, whereby knee input energy of the small-statured occupant can be absorbed. When a knee of a vehicle occupant of an average constitution is in contact with the knee protector, the upper absorption bracket which lies at a high position is mainly deformed, whereby knee input energy of the occupant of the average constitution can be absorbed. By thus properly using the two upper and lower absorption brackets it is possible to let the knee protector cope with various vehicle occupants different in stature or constitution.

DISCLOSURE OF THE INVENTION

Problems to be Solved by the Invention

In the above-mentioned knee protector, however, as a spacing in a longitudinal direction of the vehicle between the input-side end portions of the lower and upper absorption brackets becomes larger, a tensile force acting on the upper absorption bracket through a connecting bracket increases when the lower absorption bracket is deformed with the knee input energy of the small-statured occupant, so that the upper absorption bracket is deformed with the tensile force. As a result of the deformation of the upper absorption bracket there occurs an increase of a reaction force, with a consequent fear that it may become impossible to effectively absorb the knee input energy of the small-statured occupant. Thus, it is difficult to adopt such a design as setting large the aforesaid spacing to ensure a wider space near the feet. This makes a cause of restriction on the design freedom for the instrument panel. It is also necessary to take a safety measure against deformation of the upper absorption bracket which is caused by the tensile force when the lower absorption bracket is deformed with the knee input energy of the small-statured occupant.

Means for Solving the Problems

For solving the above-mentioned problems, in a first aspect of the present invention there is provided a knee protector structure for a vehicle, comprising a lower absorption bracket able to absorb knee input energy of a small-statured vehicle occupant, an upper absorption bracket able to absorb knee input energy of a vehicle occupant of an average constitution, a connecting bracket for connection between input-side end portions of the lower and upper absorption brackets, and tensile force absorbing means disposed near the input-side end portion of the upper absorption bracket and able to absorb a tensile force exerted from the connecting bracket.

For solving the above-mentioned problems, in a second aspect of the present invention there is provided, in combination with the above first aspect, a knee protector structure for a vehicle wherein a protective member is provided for the tensile force absorbing means.

Effect of the Invention

According to the knee protector structure for a vehicle in the first aspect of the present invention, the tensile force absorbing means able to absorb the tensile force exerted from the connecting bracket is disposed near the input-side end portion of the upper absorption bracket, so even if a tensile force acts on the upper absorption bracket through the connecting bracket when the lower absorption bracket is deformed with knee input energy of a small-statured occupant, the tensile force absorbing means absorbs the tensile force and can prevent deformation of the whole of the upper absorption bracket positively and substantially. Consequently, an increase of a reaction force is suppressed and it becomes possible to effectively absorb the knee input energy of the small-statured occupant. By the above "prevent substantially" is meant that such a degree of deformation as brings about an allowable increase of a reaction force is allowed. According to the above construction, it becomes possible to widen the spacing in the vehicular longitudinal direction between the input-side end portions of the lower and upper absorption brackets. Consequently, it becomes possible to ensure a wide space near the occupant's feet and hence possible to improve the design freedom for the instrument panel.

According to the knee protector structure for a vehicle in the second aspect of the present invention, in addition to the components of the knee protector structure for a vehicle in the above first aspect, a protective member is provided for the tensile force absorbing means, whereby not only the effects of the knee protector structure for a vehicle in the first aspect are obtained, but also a knee of a small-statured occupant can be prevented from coming into direct contact with deformed tensile force absorbing means even when the tensile force absorbing means is deformed upon operation thereof, thus making it possible to afford a more effective safety measure.

BEST MODE FOR CARRYING OUT THE INVENTION

Embodiments of the present invention will be described hereunder with reference to the drawings.

First Embodiment

Figure 1:
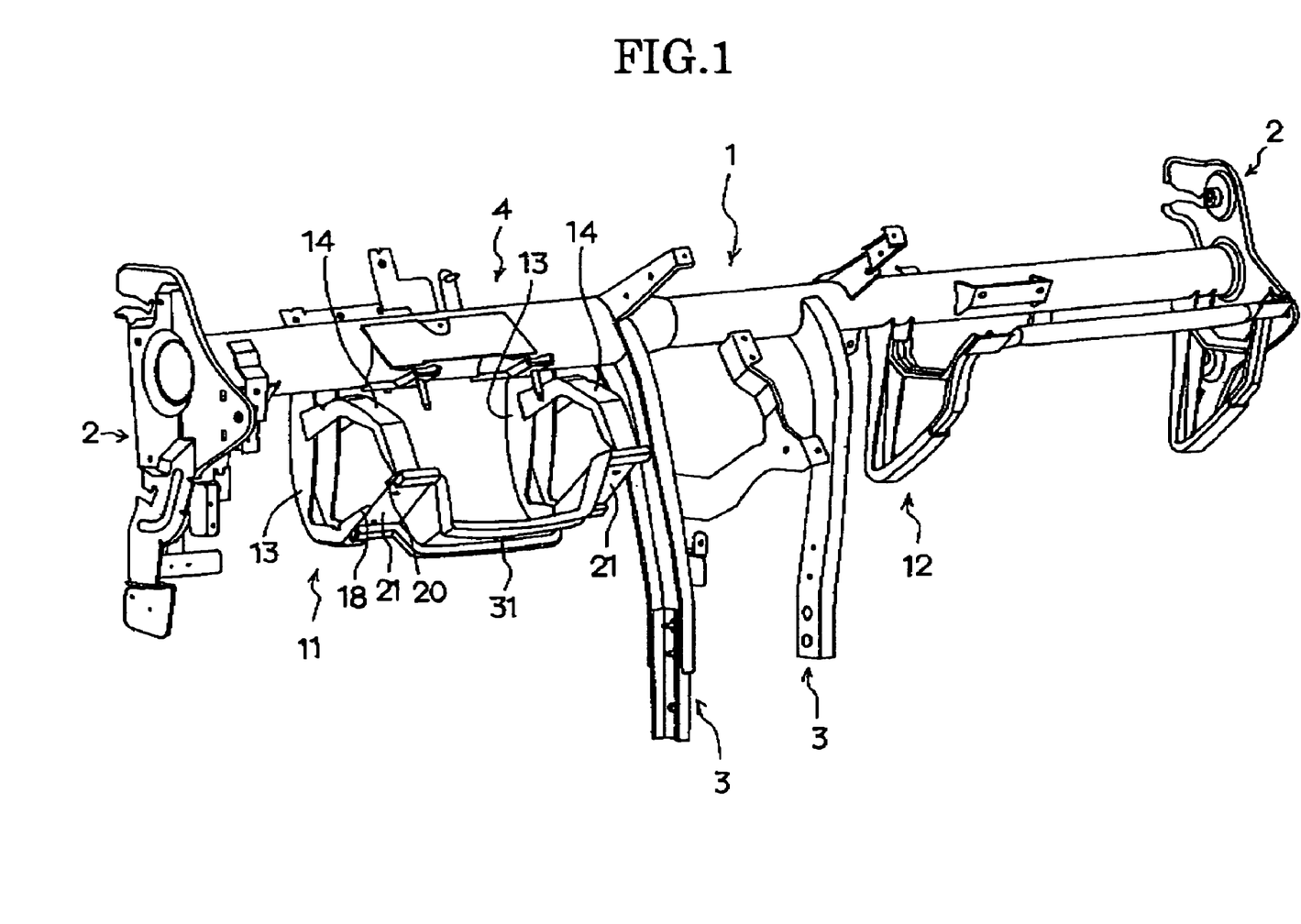
FIG. 1 is a perspective view of a vehicle body-side member portion in a knee protector structure for a vehicle according to a first embodiment of the present invention.
Figure 2:
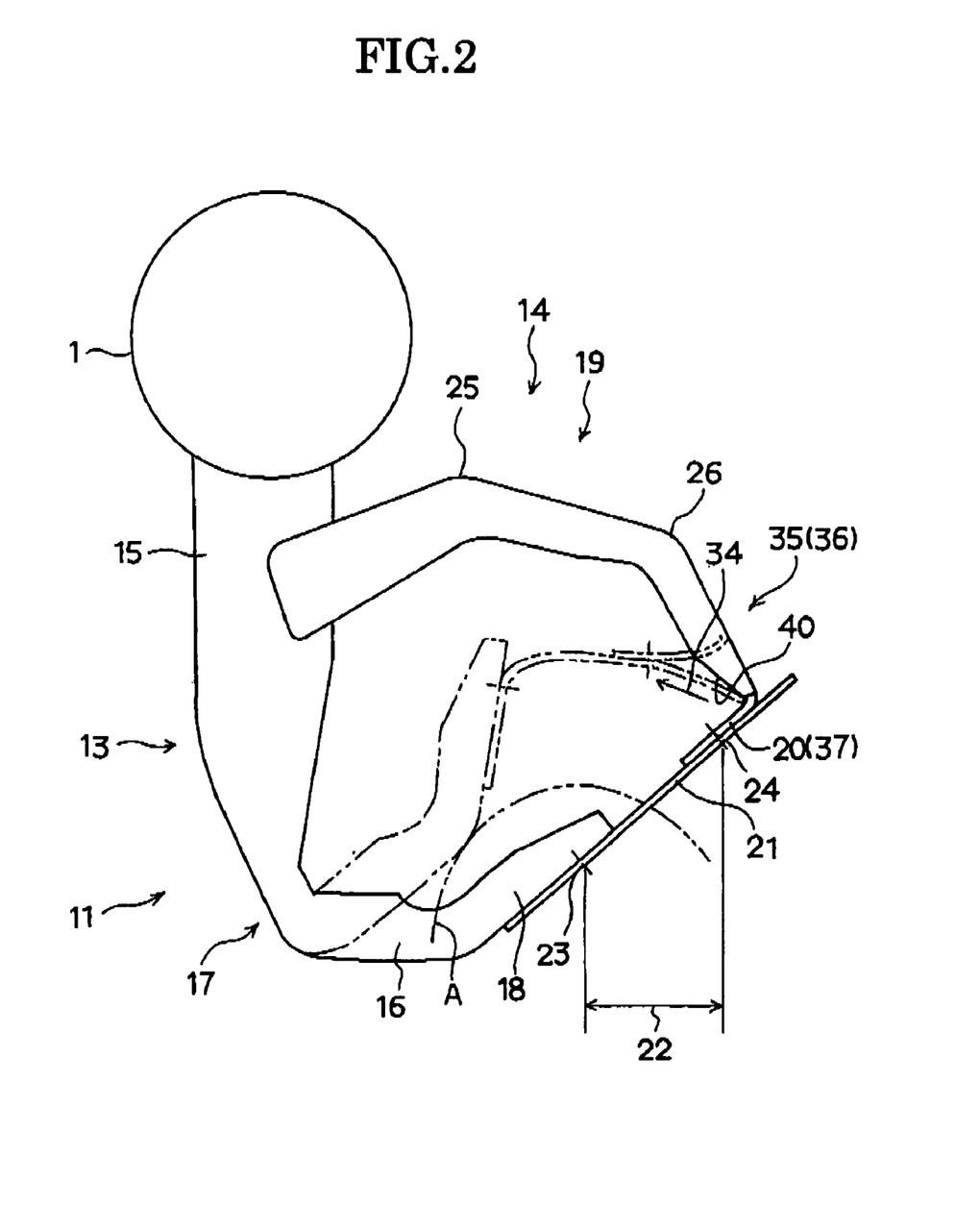
FIG. 2 is a side view of a vehicular knee protector portion shown in FIG. 1.
Figure 3:
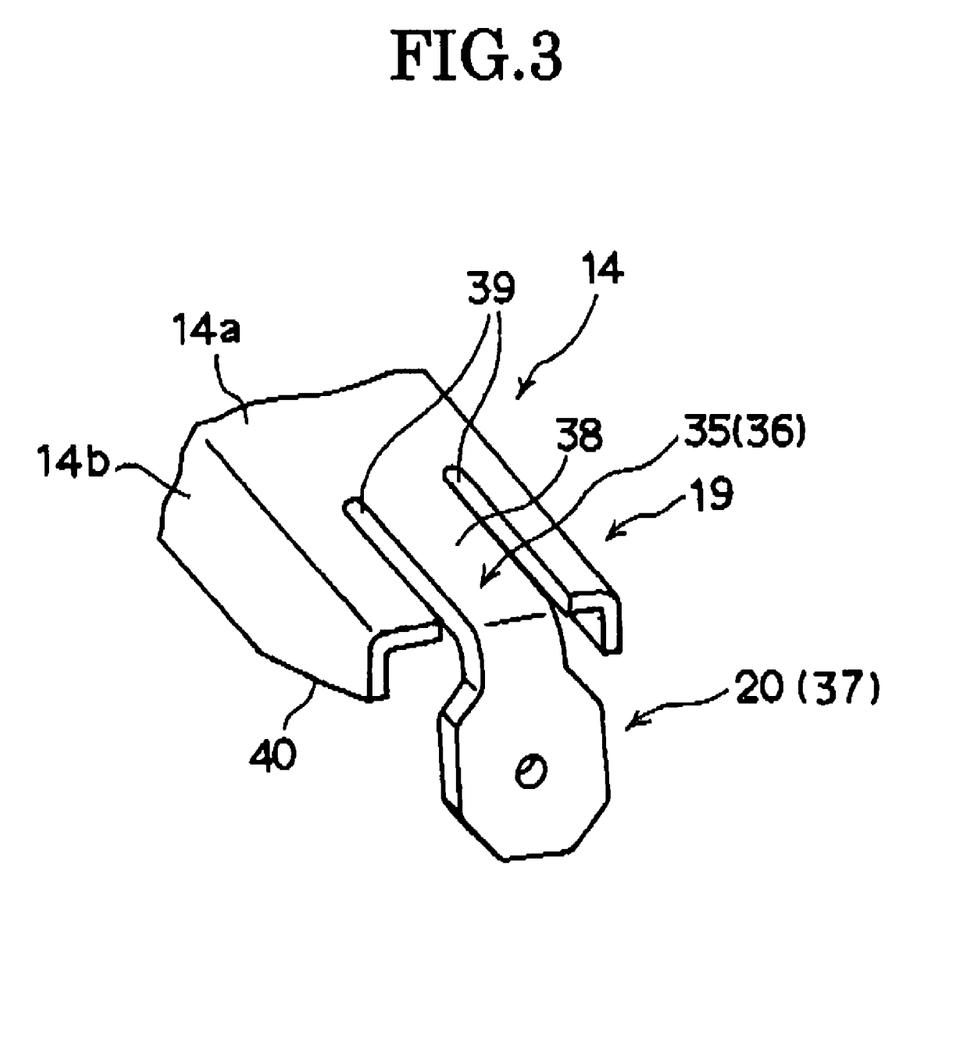
FIG. 3 is a partial, enlarged, perspective view of an input-side end portion of an upper absorption bracket shown in FIG. 2.

FIGS. 1 to 3 illustrate a first embodiment of the present invention.

A description will be given first about construction. In a vehicle such as an automobile, an instrument panel is provided in a front portion within a vehicle compartment. In an interior of the instrument panel, as shown in FIG. 1, there is provided a vehicle body-side member 1, e.g., a steering support member, as a strength-ensuring member which extends substantially in a transverse direction of the vehicle to provide a connection between both right and left body panels.

The vehicle body-side member 1 is constituted, for example, by a metallic pipe and is formed so as to be thick at its driver's seat-side portion which requires a high strength and thin at its central and front passenger seat-side portions not requiring a high strength. The vehicle body-side member 1 shown in FIG. 1 is of a left-hand drive vehicle. Various other vehicle body-side members are existent than the illustrated vehicle-body side member 1. Vehicle body mounting brackets 2 for mounting the vehicle body-side member 1 to both right and left body panels are attached to both end portions respectively of the vehicle body-side member 1. A pair of stays 3 for allowing the vehicle body-side member 1 to be supported by a floor panel are attached to the central portion of the vehicle body-side member 1. A column bracket 4 for mounting a steering column is attached to the driver's seat-side portion of the vehicle body-side member 1. Various other brackets also are mounted on the vehicle body-side member 1.

Knee protectors 11 and 12 are installed on the vehicle body-side member 1 to protect the knees of vehicle occupants in case of emergency. The knee protectors 11 and 12 are provided separately in a driver's seat-side portion and a front passenger seat-side portion.

The driver's seat-side knee protector 11 is provided in a vertically functionally divided manner with a pair of lower absorption brackets 13 able to absorb knee input energy of a small-statured occupant (e.g., a small-statured female occupant) and a pair of upper absorption brackets 14 able to absorb knee input energy of an occupant of an average constitution (e.g., a male occupant of an average constitution). The lower absorption brackets 13 and the upper absorption brackets 14 are different in strength such that the former generates a relatively small reaction force when receiving the knee input energy and the latter generates a relatively large reaction force when receiving the knee input energy. To avoid interference between the lower and upper absorption brackets 13, 14, the lower absorption brackets 13 are formed in such a shape as can be deformed downward as a whole, while the upper absorption brackets 14 are formed in such a shape as can be deformed upward as a whole.

More specifically, as indicated with a solid line in FIG. 2, the lower absorption brackets 13 are each provided with a vertical portion 15 extending approximately downward from the vehicle body-side member 1 and a rear extending portion 16 extending approximately rearward of the vehicle (to the occupant side) from a lower end of the vertical portion 15. A weak portion 17 is formed in a boundary (a bent portion) between the vertical portion 15 and the rear extending portion 16. At a rear end of the rear extending portion 16 is formed an input-side end portion 18 by bending, the input-side end portion 18 extending rearwardly upward at a predetermined angle. The lower absorption brackets 13 are each formed by bending a metallic plate having a predetermined thickness. Therefore, the lower absorption brackets 13 each have an upward or rearward U-shaped section including a central connecting portion and both-side flange portions (see FIG. 1). The weak portion 17 is formed by constricting the both-side flange portions.

On the other hand, the upper absorption brackets 14 are each provided with a rearward extending portion 19 extending substantially rearward of the vehicle (to the occupant side) as a whole from near an upper end of the vertical portion 15 of each lower absorption bracket 13. At a rear end of the rear extending portion 19 is formed an input-side end portion 20 by bending so as to be inclined forwardly downward at a predetermined angle. The upper absorption brackets 14 are each formed by bending a metallic plate having a predetermined thickness (see FIG. 1). Therefore, the upper absorption brackets 14 each have a downward U-shaped section including a central connecting portion 14a and both-side flange portions 14b (see FIG. 3).

Further, each upper absorption bracket 14 is formed so that it can bend in plural stages with knee input energy of a vehicle occupant of an average constitution. To this end, plural bent portions 25 and 26 are formed in each upper absorption bracket 14. Although in the illustrated example in the bent portions 25 and 26 are formed in two stages, such bent portions may be provided in three or more stages. For example, in order to equalize the received reaction force it is preferable that the bent portions 25 and 26 be formed at approximately equal spacings with respect to the upper absorption bracket 14. The bent portions 25 and 26 may also be formed at unequal spacings for setting a deformation mode of the upper absorption bracket 14. As noted above, it is preferable for the bent portions 25 and 26 to be bent in a chevron-shaped fashion so that the upper absorption bracket 14 is deformed upward as a whole. In this case, a mounting portion (the portion ahead of the bent portion 25) of the upper absorption bracket 14 for mounting to the associated lower absorption bracket 13 is inclined forwardly downward so that the upper absorption bracket 14 assumes a nearly horizontal state as a whole.

The input-side end portions 18 and 20 of each lower absorption bracket 13 and the associate upper absorption bracket 14 are connected together using a connecting bracket 21. More specifically, first, both input-side end portions 18 and 20 are disposed through a predetermined spacing (a vehicular longitudinal spacing 22) in the vertical and vehicular longitudinal directions. Both input-side end portions 18 and 20 are fixed respectively to lower and upper end sides of the connecting bracket 21 with use of clamping elements 23 and 24 such as bolts and nuts. Therefore, bolt holes for insertion therethrough of the clamping elements 23 are formed in the input-side end portions 18, 20 and also in the connecting bracket 21. The connecting bracket 21 is inclined forwardly downward in conformity with the shape of a feet space below the instrument panel. In correspondence thereto, the input-side end portions 18 and 20 of the lower and upper absorption brackets 13, 14 are also bent upward and downward in conformity with the inclined shape of the connecting bracket 21 as noted earlier.

The connecting bracket 21 is constructed so that it can be bent with knee input energy of a small-statured occupant. Therefore, at least the portion of the connecting bracket 21 located between the clamping elements 23 and 24 is formed in the shape of a flat plate free from any concave or convex. Besides, the flat plate portion of the connecting bracket 21 is made a thin plate having a wall thickness capable of being bent with knee input energy of a small-statured occupant. Where required, the connecting bracket 21 may be formed with a weak portion or the like.

As shown in FIG. 1, the lower absorption brackets 13 and the upper absorption brackets 14 are provided so as to make a pair of right and left with the column bracket 4 therebetween. A knee receiving plate 31 is disposed between the right and left, lower and upper absorption brackets 13, 14. The connecting brackets 21 are formed at both right and left end portions of the knee receiving plate 31. The knee receiving plate 31 is formed in a convex shape projecting rearwards of the vehicle so as to bypass a steering column. The knee receiving plate 31 presents a predetermined concave/convex shape so that it can have a required strength. In this case, the knee receiving plate 31 has a ridge portion extending along upper and lower edges and projecting to the occupant side.

In this first embodiment, as shown in FIG. 3, tensile force absorbing means 35 able to absorb a tensile force 34 exerted from the connecting bracket 21 is provided at the input-side end portion 20 of each upper absorption bracket 14.

The tensile force absorbing means 35 is made a tensile deforming portion 36 able to partially deform the input-side end portion 20 and thereabouts of the upper absorption bracket 14 under the action of the tensile force 34.

More particularly, the tensile deforming portion 36 is made up of a flat plate-like mounting surface portion 37 and a tensile deforming surface portion 38 extending forward of the vehicle from the mounting surface portion 37 and separated at 39 from the other portion of the input side end portion 20.

Therefore, by removing both-side flange portions 14b of each upper absorption bracket 14, the flat plate-like mounting surface portion 37 is constituted by only the central connecting portion 14a, which is made the input-side end portion 20. Further, predetermined slits 39 for forming the tensile deforming surface portion 38 are formed in boundary portions between the central connecting portion 14a and both-side flange portions 14b or in the central connecting portion 14a in the vicinity of the input-side end portion 20 of the upper absorption bracket 14. The slits 39 are formed in a pair at a predetermined length toward the front side of the vehicle in the portion of the upper absorption bracket 14 located near the input-side end portion 20.

Interference preventing portions 40 for preventing interference with the bent connecting bracket 21 are formed in both-side flange portions 14b in the vicinity of the input-side end portions 20 of each upper absorption bracket 14. The interference preventing portions 40 are formed as slant faces such as tapered relief faces.

Next, operation of this first embodiment will be described below.

In case of emergency, when the knees of a vehicle occupant of an average constitution get into the front portion of the vehicle nearly horizontally, the upper absorption brackets 14, which are located at a high position and generate a large reaction force, are deformed through the knee receiving plate 31 and the connecting brackets 21, whereby knee input energy of the occupant of an average constitution can be absorbed. At this time, even if the lower absorption brackets 13 are deformed through the connecting brackets 21, there occurs no special influence because the reaction force generated by the lower absorption brackets 13 is small.

In this case, the upper absorption brackets 14 may each be constructed so as to be bent in plural stages with knee input energy of the vehicle occupant of an average constitution. According to this construction, a reaction force upon energy reception at each time after deformation of the upper absorption bracket 14 and until deformation of the associated lower absorption bracket 13 is maintained at a near constant high value to eliminate dropping of the reaction force, thereby permitting improvement of the energy absorption efficiency as a whole.

Further, in case of emergency, when the knees (see the symbol A in FIG. 2) of a small statured vehicle occupant get into the front portion of the vehicle nearly horizontally or in a somewhat forwardly upward direction rather than the horizontal direction, the lower absorption brackets 13, which are located at a low position and generate a small reaction force, are deformed through the knee receiving plate 31 and the connecting brackets 21, as shown in phantom in FIG. 2, whereby knee input energy of the small-statured occupant is absorbed.

In this case, the connecting brackets 21 are each constructed so that it can be bent with the knee input energy of the small-statured occupant, whereby the knee input energy is transmitted to the associated upper absorption bracket 14 to prevent deformation of the upper absorption bracket 14, thereby making it possible to absorb the knee input energy of the small-statured occupant effectively.

Thus, since the two absorption brackets—the lower and upper absorption brackets 13, 14—can be used properly, the protector in question can cope with various vehicle occupants different in stature or constitution.

Figure 4:
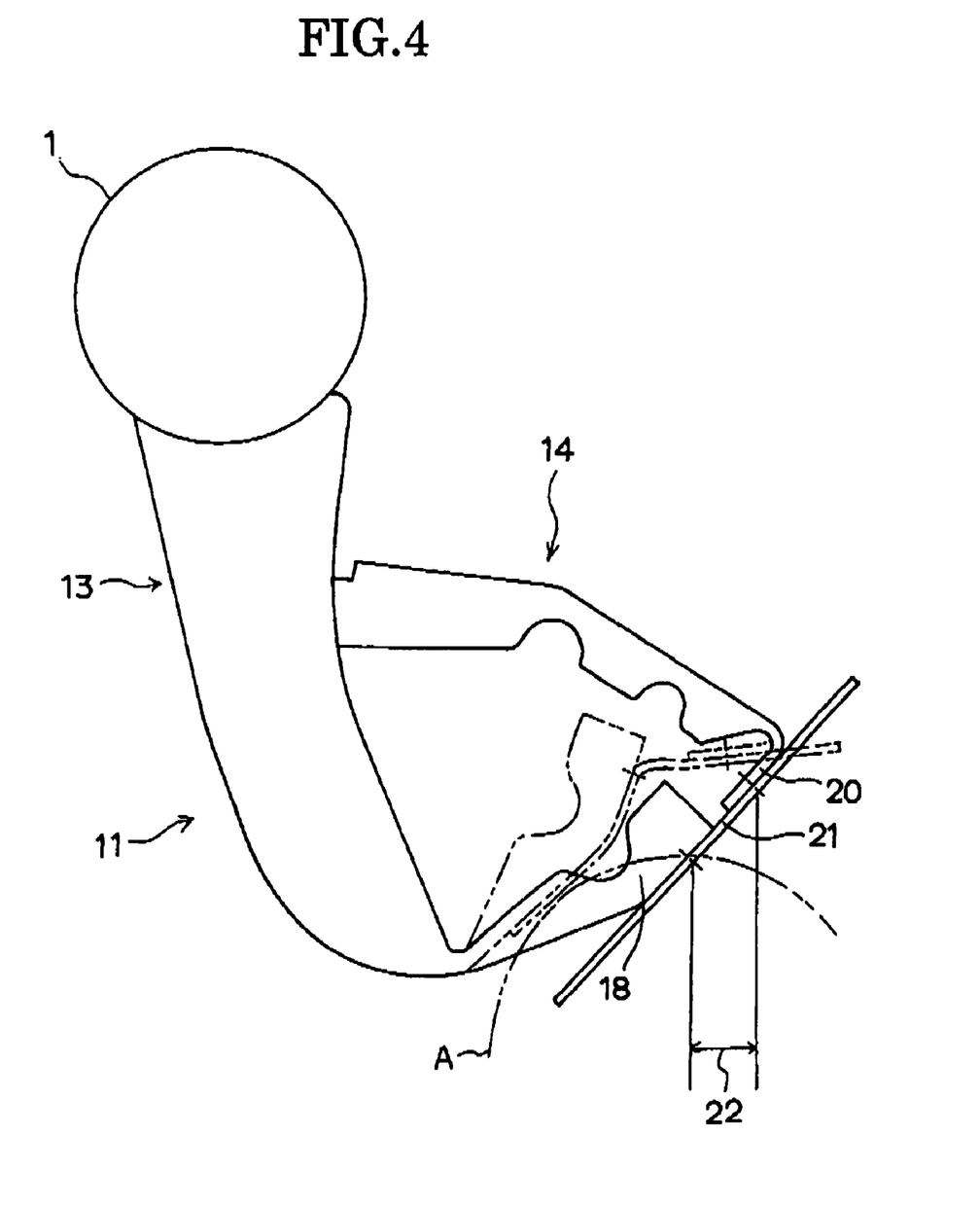
FIG. 4 is a side view of a knee protector portion in a comparative example 1.

As shown in a comparative example 1 of FIG. 4, in the case where a spacing 22 in the vehicular longitudinal direction between input-side end portions 18 and 20 of a lower absorption bracket 13 and an upper absorption bracket 14 is small and when the lower absorption bracket 13 is deformed by knee input energy of a small-statured vehicle occupant, there is no fear that such a tensile force as causes a problem may be exerted on the upper absorption bracket 14 by a connecting bracket 21. That is, the connecting bracket 21 merely undergoes a flexural deformation as shown in phantom in FIG. 4. The lower and upper absorption brackets 13, 14 used in the comparative example 1 have respective shapes somewhat different from those used in the first embodiment.

Figure 5:
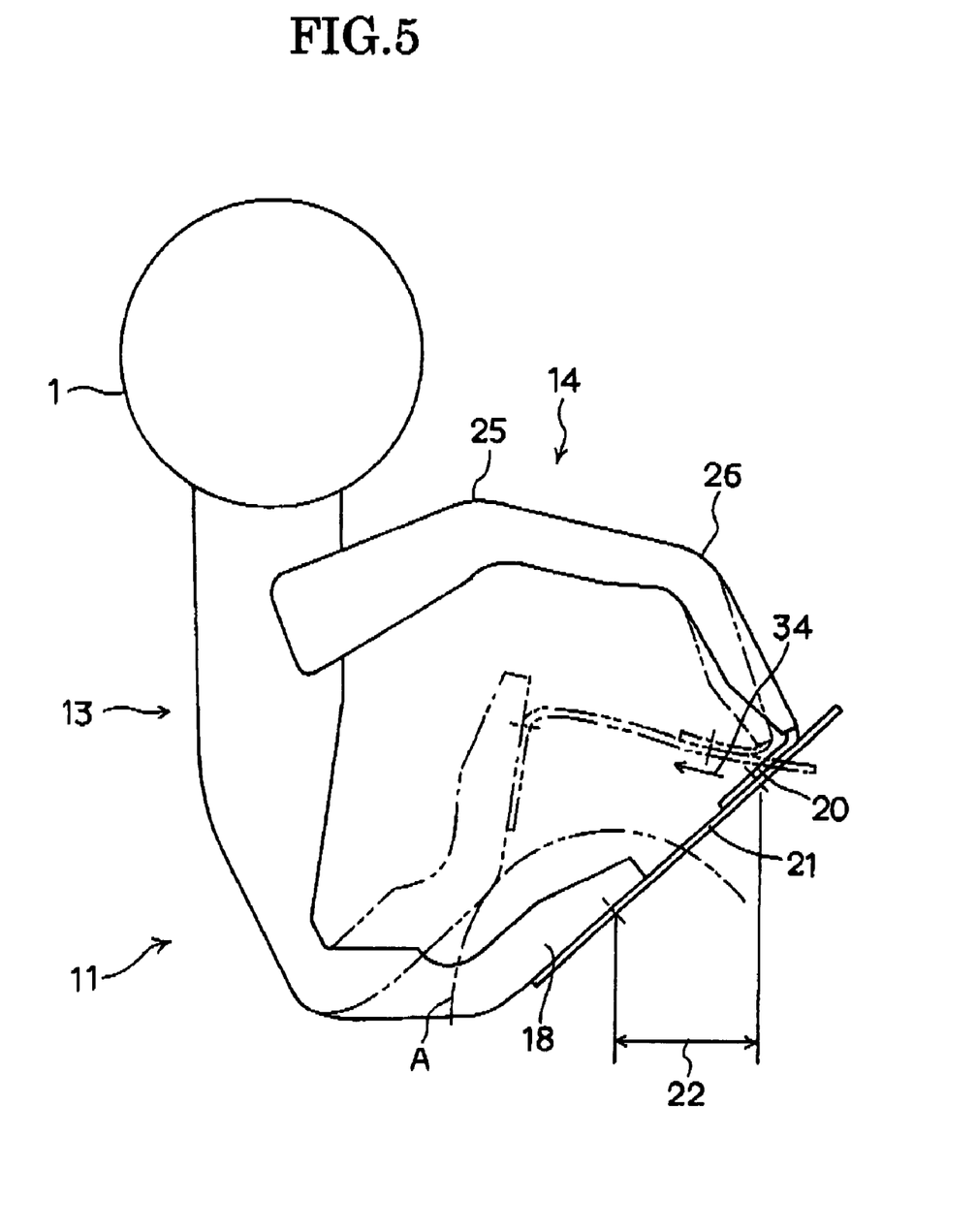
FIG. 5 is a side view of a knee protector portion in a comparative example 2.
Figure 6:
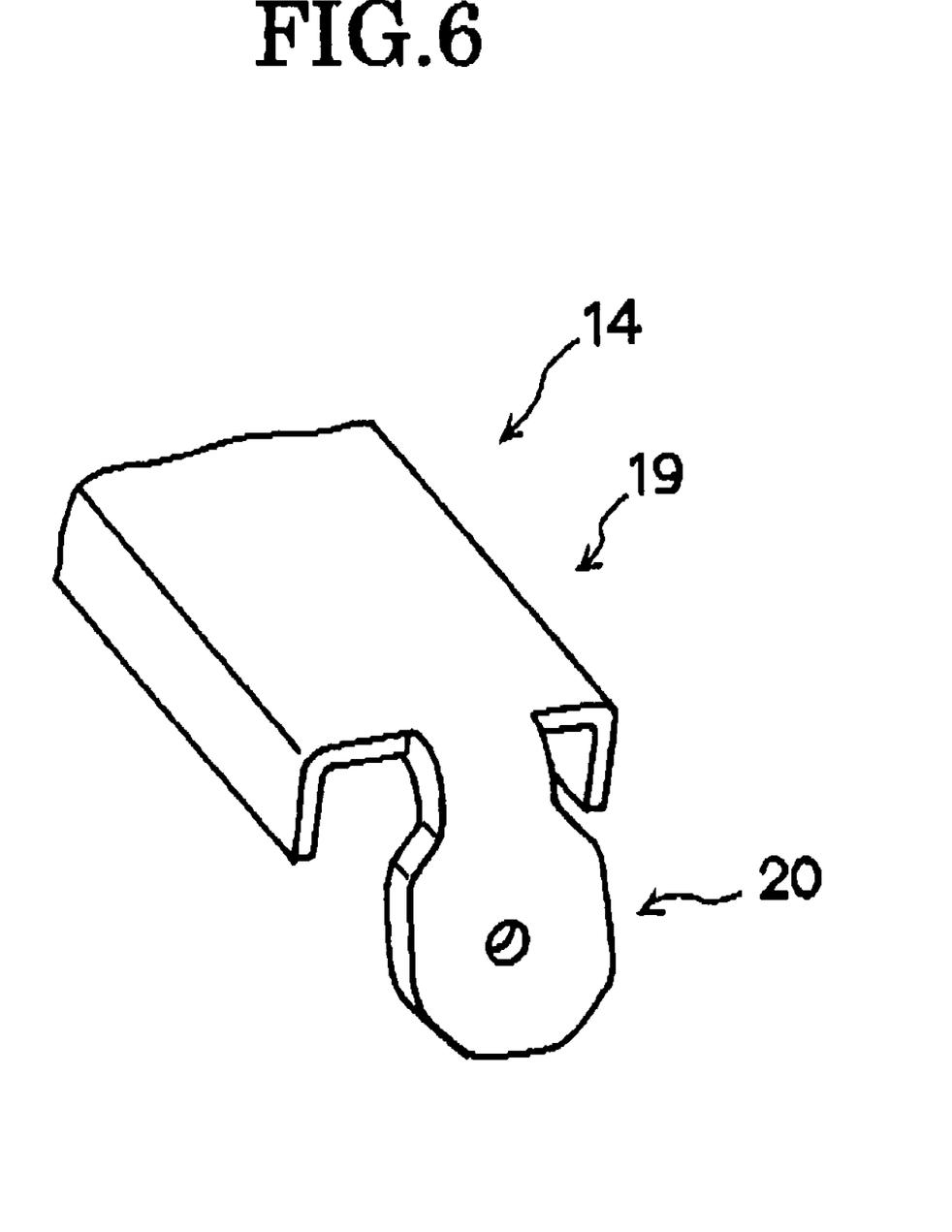
FIG. 6 is a partial, enlarged, perspective view of an input-side end portion of an upper absorption bracket shown in FIG. 5.

However, as shown in a comparative example 2 of FIG. 5, in the case where a spacing 22 in the vehicular longitudinal direction between input-side end portions 18 and 20 of a lower absorption bracket 13 and an upper absorption bracket 14 is large and when the lower absorption bracket 13 is deformed with knee input energy of a small-statured vehicle occupant, not only a connecting bracket 21 undergoes a flexural deformation, but also a tensile force 34 is exerted on the upper absorption bracket 14 through the connecting bracket 21. Therefore, in the case of a structure not provided with tensile force absorbing means 35, as shown in FIG. 6, (e.g., a structure wherein the rear extending portion 19 is provided with neither a deflanged portion 40 nor a tensile deforming surface portion 38), the upper absorption bracket 14 is deformed as shown in phantom in FIG. 5 by virtue of the said tensile force. As a result, there occurs an increase of reaction force and there is a fear that it may become impossible to absorb the knee input energy of the small-statured occupant effectively. There is a tendency that the larger the spacing 22, the larger the tensile force 34.

In this first embodiment, in view of the point just described above, the tensile force absorbing means 35 able to absorb the tensile force 34 exerted from the connecting bracket 21 is disposed near the input-side end portion 20 of the upper absorption bracket 14. With the tensile force absorbing means 35, even if the tensile force 34 acts on the upper absorption bracket 14 through the connecting bracket 21 when the lower absorption bracket 13 is deformed with knee input energy of a small-statured occupant, the tensile force absorbing means 35 absorbs the tensile force 34 and can thereby prevent deformation of the entire upper absorption bracket 14 positively. Consequently, an increase of reaction force is prevented and it becomes possible to absorb the knee input energy of the small statured occupant effectively.

According to the above construction, moreover, it becomes possible to widen the spacing in the vehicular longitudinal direction between the input-side end portions 18 and 20 of the lower and upper absorption brackets 13, 14, so that it becomes possible to ensure a wide foot space and hence possible to improve the design freedom for the instrument panel.

Besides, the tensile force absorbing means 35 is made the tensile deforming portion 36 able to partially deform the input-side end portion 20 of the upper absorption bracket 14 and thereabouts under the action of the tensile force 34, whereby the tensile force 34 can be absorbed by only a partial deformation of the tensile deforming portion 36. Further, since the structure of the tensile deforming portion 36 is simple, it is possible to enhance the layout freedom for the interior of the instrument panel and hence possible to facilitate the design for the interior of the instrument panel.

Additionally, by forming the tensile deforming portion 36 with both the flat plate-like mounting surface portion 37 and the tensile deforming surface portion 38, the tensile deforming surface portion 38 extending forward of the vehicle from the mounting surface portion 37 and being separated from the other portions of the input-side end portions 18 and 20, the tensile force 34 can be absorbed because the tensile deforming surface portion 38 is deformed like being stripped off. The mounting surface portion 37 and the tensile deforming surface portion 38 can be easily formed in the input-side end portion 20 of the upper absorption bracket 14. If the shape of the input-side end portion 20 of the upper absorption bracket 14 is altered and the tensile deforming portion 36 and the tensile deforming surface portion 38 are formed by post-machining, it becomes possible to use the upper absorption bracket 14 and the knee protectors 11, 12 in common.

Although the first embodiment of the present invention has been described above in detail with reference to drawings, the above embodiment is mere illustrative of the present invention and therefore it goes without saying that the present invention is not limited to the construction of the embodiment described above and that design changes, etc. falling under the scope not departing from the gist of the present invention are also included in the present invention.

Second Embodiment

A second embodiment of the present invention will now be described with reference to FIGS. 7 and 8. The construction of this second embodiment is the same as or similar to the construction of the first embodiment except that a protective member 45 is provided in a tensile force absorbing means 35. Therefore, the same or similar constituent portions are identified by like reference numerals and explanations of their operations and functions will be omitted.

Figure 7:
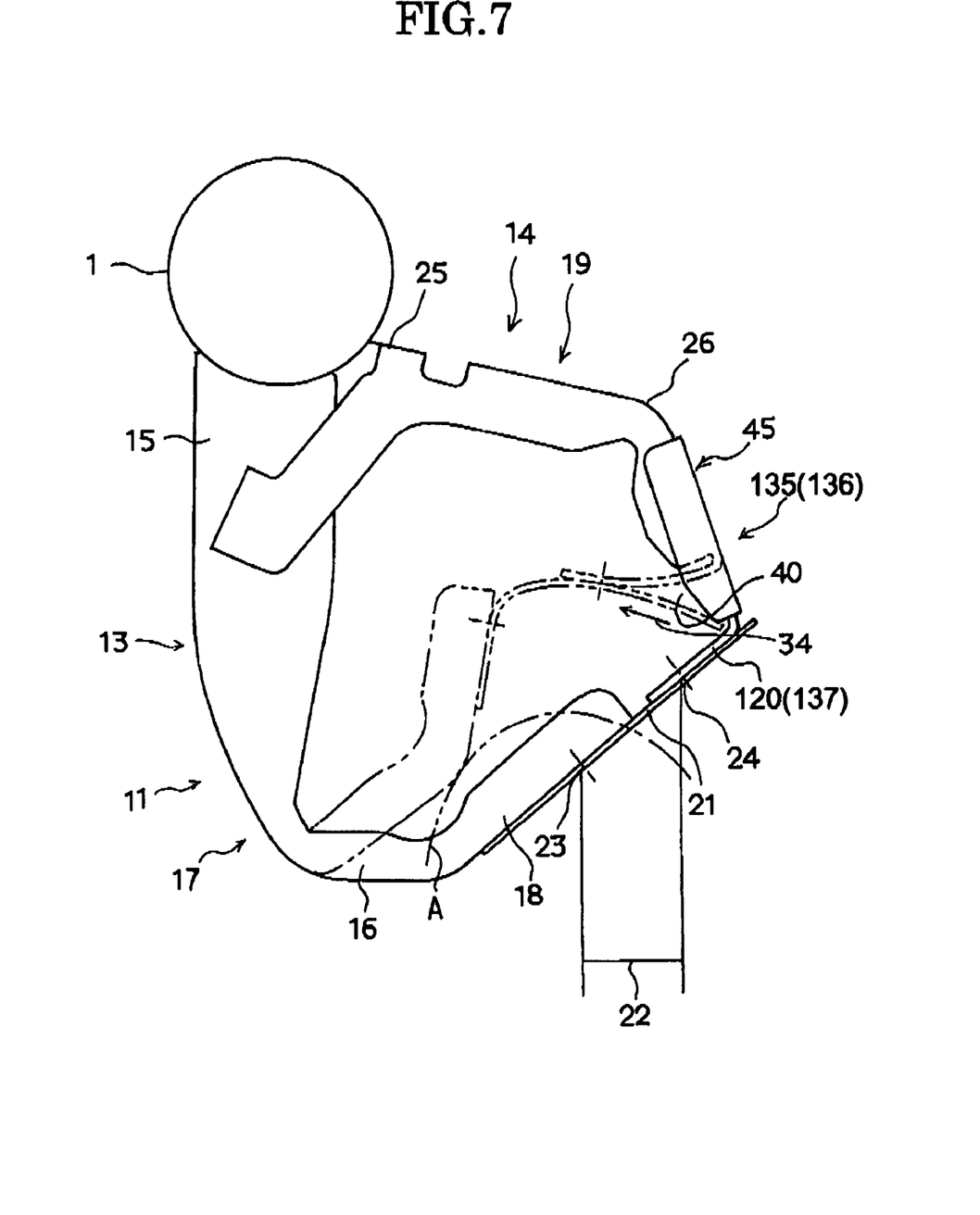
FIG. 7 is a side view of a knee protector portion in a knee protector structure for a vehicle according to a second embodiment of the present invention.
Figure 8:
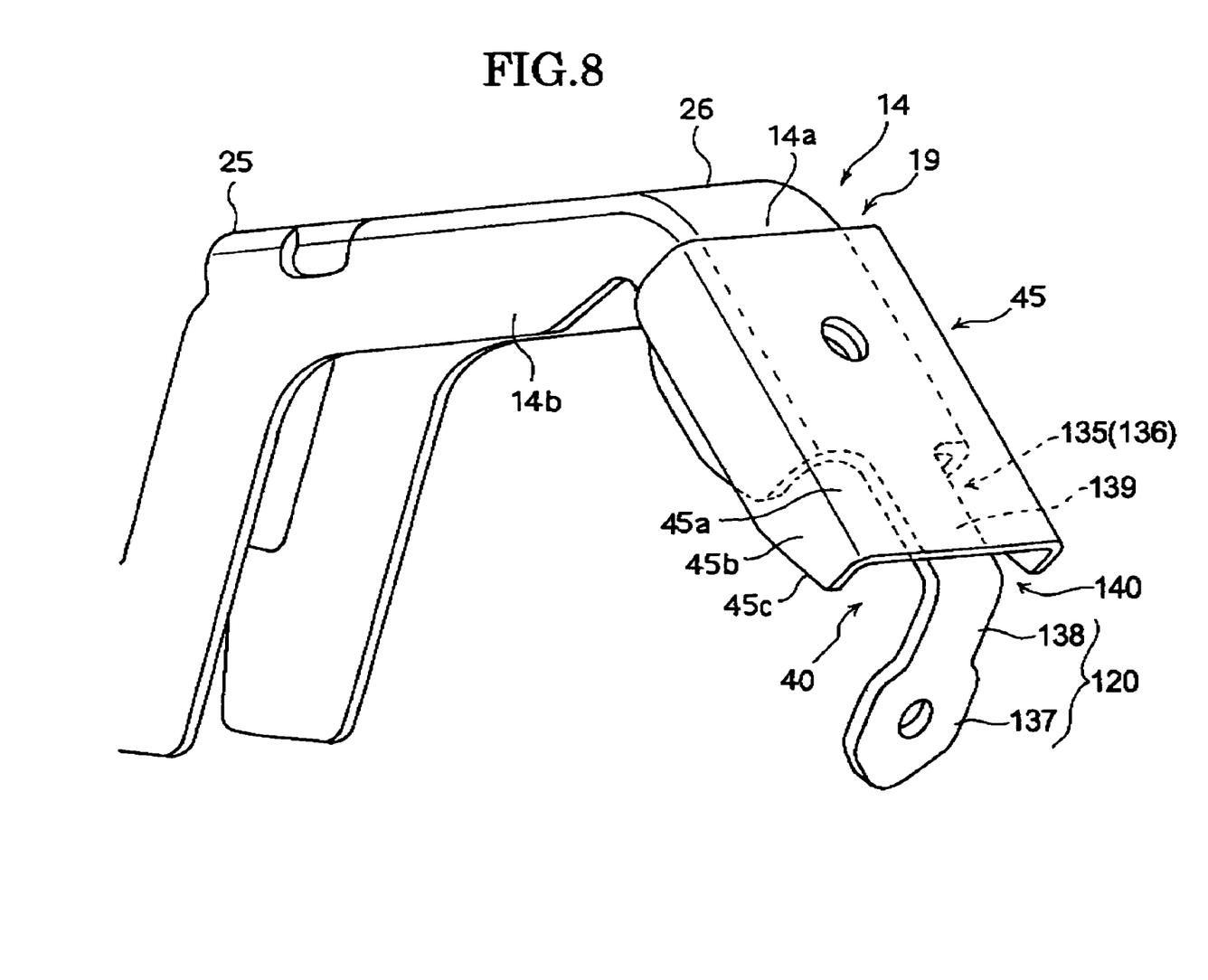
FIG. 8 is a partial, enlarged, perspective view of an input-side end portion of an upper absorption bracket shown in FIG. 7.

In this second embodiment, as shown in FIG. 7, tensile force absorbing means 135 able to absorb a tensile force 34 exerted from a connecting bracket 21 is provided in and near an input-side end portion 120 of an upper absorption bracket 14.

The tensile force absorbing means 135 is made a tensile deforming portion 136 able to partially deform the input-side end portion 120 and thereabouts under the action of the tensile force 34.

More specifically, the tensile deforming portion 136 is composed of narrow band-like tensile deforming surface portions 138 and 139 extending from a mounting surface portion 137.

Therefore, a deflanged portion 140 of only a central connecting portion 14a free of both-side flange portions 14b is provided at the input-side end portion 120 of the upper absorption bracket 14 and also at a portion of a rearward extending portion 19 located near the input-side end portion 120, and the mounting surface portion 137 and the narrow band-like tensile deforming surface portions 138, 139 are formed by machining the central connecting portion 14a of the deflanged portion 140. The mounting surface portion 137 is formed at a front end of the input-side end portion 120 in a shape suitable for mounting clamping elements 24. The tensile deforming surface portions 138 and 139 are formed so as to be narrower than the width of the central connecting portion 14a of the upper absorption bracket 14 and that of the mounting surface portion 137. The tensile deforming surface portion 138 is formed on the input-side end portion 120 side, while the tensile deforming surface portion 139 is formed on the rearward extending portion 19 side. The foregoing bent portion is interposed between the tensile deforming surface portions 138 and 139. The mounting surface portion 137 and the tensile deforming surface portion 138 are in a protected state by the connecting bracket 21 because the connecting bracket 21 is put in abutment against those portions 137 and 138.

Moreover, a protective member 45 is provided in the tensile force absorbing means 135. The protective member 45 is disposed so as to cover the tensile deforming surface portion 139 of the rearward extending portion 19 and the vicinity thereof from above. The protective member 45 is fixed to the rearward extending portion 19 on an inner side (front side) with respect to the deflanged portion 140 with use of clamping elements such as bolt and nut or by spot welding. When the upper absorption bracket 14 is deformed with knee input energy of a vehicle occupant of an average constitution, the protective member 45 functions also as an energy receiving member to absorb knee input energy integrally with the upper absorption bracket 14. In this case, care must be exercised so that the deformation of the tensile deforming surface portion 139 is not obstructed by the protective member 45. Correspondingly to the central connecting portion 14a and both-side flange portions 14b the protective member 46 has a central connecting portion 45a and both-side flange portions 45b which are a size larger than those portions 14a and 14b. In the vicinity of the input-side end portion 120 the both-side flange portions 45b are formed with interference preventing portions 45c for preventing interference with the bent connecting bracket 21. The interference preventing portions 45c are formed as slant faces such as tapered relief faces.

Further, by forming the tensile deforming portion 136 with both narrow band-like tensile deforming surface portions 138 and 139, the tensile force 34 can be absorbed because the tensile deforming surface portions 138 and 139 are deformed like being stripped off. The mounting surface portion 137 and the tensile deforming surface portions 138, 139 can be easily formed in the input-side end portion 120 of the upper absorption bracket 14. If the shape of the input-side end portion 120 of the upper absorption bracket 14 is altered and the tensile deforming portion 13 and the tensile deforming surface portions 138, 139 are formed by post-machining, it becomes possible to use the upper absorption bracket 14 and the knee protectors 11, 12 in common.

In this second embodiment, since the protective member 45 is provided in the tensile force absorbing means 135, even when the tensile force absorbing means 135 is deformed upon operation, it is possible to prevent a knee of a small-statured occupant from coming into direct contact with the tensile force absorbing means 135 and hence possible to obtain a more effective safety measure.

The protective member 45 functions not only as a mere protective member but also as an energy receiving member for absorbing knee input energy integrally with the upper absorption bracket 14 when the upper absorption bracket 14 is deformed with knee input energy of a vehicle occupant of an average constitution.

Although the embodiments of the present invention have been described above in detail with reference to drawings, the above embodiments are mere illustrative of the present invention and therefore it goes without saying that the present invention is not limited to the construction of the embodiments described above and that design changes, etc. falling under the scope not departing from the gist of the present invention are also included in the present invention.

What is claimed is:

1. A knee protector structure for a vehicle, comprising:
 a lower absorption bracket able to absorb knee input energy of a small-statured vehicle occupant;
 an upper absorption bracket, able to absorb knee input energy of a vehicle occupant of an average constitution, comprising both-side flange portions and a central connecting portion for connection between the both-side flange portions;
 a connecting bracket for connection between an input-side end portion of the lower absorption bracket and an input-side end portion of the upper absorption bracket; and
 tensile force absorbing means configured to absorb a tensile force exerted from the connecting bracket;
 wherein the tensile force absorbing means is provided near, among the input-side end portion of the upper absorption bracket, the input-side end portion of the upper absorption bracket, constituted by the central connecting portion, and the connecting bracket, so as to be able to absorb a tensile force exerted upon the upper absorption bracket through the connecting bracket when the lower absorption bracket is deformed,
 wherein a tensile deforming portion is provided at the input-side end portion of the upper absorption bracket and comprises a flat plate-like mounting surface portion and a tensile deforming surface portion,
 wherein the tensile deforming surface portion extends forward of the vehicle from the flat plate-like mounting surface portion and is separated from a remaining portion of the input-side end portion of the upper absorption bracket except for the flat-plate like mounting surface portion of said input-side end portion of the upper absorption bracket, and
 wherein the tensile deforming surface portion comprises the flat plate-like mounting surface portion constituted by the central connecting portion and a pair of cut-in portions required for forming the tensile deforming surface portion, the cut-in portions being formed at a predetermined length toward a front side of the vehicle in boundary portions between the central connecting portion and the both-side flange portions near the input-side end portion of the upper absorption bracket or in the central connecting portion near the input-side end portion of the upper absorption bracket.

2. A knee protector structure for a vehicle according to claim 1, further comprising a protective member provided on the tensile force absorbing means.

3. A knee protector structure for a vehicle according to claim 1,
 wherein the lower absorption bracket has such a shape as can be deformed downward as a whole, while the upper absorption bracket has such a shape as can be deformed upward as a whole, to prevent interference between both the lower and upper absorption brackets when deformed.

4. A knee protector structure for a vehicle according to claim 1,
 wherein the lower absorption bracket comprises:
 a vertical portion extending substantially downward from a vehicle body-side member,
 a rearward extending portion extending substantially rearward of the vehicle from a lower end of said vertical portion,
 a weak portion formed at a boundary between the vertical portion and the rearward extending portion or at a bent portion, and
 an input-side end portion formed by bending rearwardly upward at a predetermined angle at a rear end of the rearward extending portion, and
 wherein the lower absorption bracket has an upward or rearward U-shaped section having a central connecting portion and both-side flange portions.

5. A knee protector structure for a vehicle according to claim 1,
 wherein the upper bracket further comprises:
 a rearward extending portion extending substantially rearward of the vehicle as a whole from a vicinity of an upper end of a vertical portion of the lower absorption bracket, and
 an input-side end portion formed by bending forwardly downward at a predetermined angle at a rear end of the rearward extending portion, and
 wherein the upward absorption bracket has a downward U-shaped section having the central connecting portion and the both-side flange portions.

6. A knee protector structure for a vehicle according to claim 1, wherein the upper absorption bracket is constructed so that it can be bent in plural stages with knee input energy of a vehicle occupant of an average constitution.

7. A knee protector structure for a vehicle according to claim 1,
 wherein a column bracket for mounting a steering column is attached to a driver's seat-side portion of a vehicle body-side member, the lower and upper absorption brackets are provided so as to make a pair of right and left with the column bracket therebetween, and a knee receiving plate is disposed between the right and left or lower and upper absorption brackets.

8. A knee protector for a vehicle, comprising:

a lower absorption bracket able to absorb knee input energy of a small-statured vehicle occupant;

an upper absorption bracket able to absorb knee input energy of a vehicle occupant of an average constitution, comprising both-side flange portions and a central connecting portion for connection between the both-side flange portions;

a connecting bracket for connection between an input-side end portion of the lower absorption bracket and an input-side end portion of the upper absorption bracket; and tensile force absorbing means disposed near the input-side end portion of the upper absorption bracket and able to absorb a tensile force exerted from the connecting bracket, wherein a deflanged portion of only the central connecting portion free of both-side flange portions is formed in the input-side end portion of the upper absorption bracket and at a rearward extending portion of the upper absorption bracket at a position near the input-side end portion, and wherein a mounting surface portion and a narrow band-like tensile deforming surface portion are formed by machining the central connecting portion of the deflanged portion.

9. A knee protector structure for a vehicle according to claim 8, further comprising a protective member provided on the tensile force absorbing means.

10. A knee protector structure for a vehicle according to claim 9, wherein the protective member is disposed so as to cover the tensile deforming surface portion of the rearward extending portion and the vicinity thereof from above.

11. A knee protector structure for a vehicle according to claim 9, wherein correspondingly to the central connecting portion and the both-side flange portions of the upper absorption bracket, the protective member includes a central connecting portion and both-side flange portions which are a size larger than those of the central connecting portion and the both-side flange portions of the upper absorption bracket, and interference preventing portions for preventing interference with the connecting bracket in a bent state are formed in the both-side flange portions in the vicinity of the input-side end portion of the upper absorption bracket.

* * * * *

UNITED STATES PATENT AND TRADEMARK OFFICE
CERTIFICATE OF CORRECTION

Page 1 of 1

PATENT NO. : 7,832,764 B2
APPLICATION NO. : 11/919670
DATED : November 16, 2010
INVENTOR(S) : Tsutomu Kawashima et al.

It is certified that error appears in the above-identified patent and that said Letters Patent is hereby corrected as shown below:

Title page, item (30) should read as follows:
(30)    The Foreign Application Priority Data:

| May 10, 2005 | (JP) | 2005-137325 |
| August 31, 2005 | (JP) | 2005-250631 |

Signed and Sealed this
Eleventh Day of January, 2011

David J. Kappos
*Director of the United States Patent and Trademark Office*